United States Patent [19]

Kurschner et al.

[11] Patent Number: 4,728,080

[45] Date of Patent: Mar. 1, 1988

[54] ELECTRIC FENCE WIRE CONSTRUCTION

[75] Inventors: Felix Kurschner, Mississauga; Richard J. Goodings, Milton, both of Canada

[73] Assignee: Bay Mills Limited, Brampton, Canada

[21] Appl. No.: 684,118

[22] Filed: Dec. 20, 1984

Related U.S. Application Data

[63] Continuation-in-part of Ser. No. 531,720, Sep. 13, 1983, abandoned.

[51] Int. Cl.⁴ .......... A01K 3/00

[52] U.S. Cl. .......... 256/10; 256/37; 256/45; 174/126 CP; 174/128 R

[58] Field of Search .......... 256/10, 4, 5, 37, 45; 57/229; 174/126 CP, 128 R, 130, 129 R; 427/389.8

[56] References Cited

U.S. PATENT DOCUMENTS

| | | | |
|---|---|---|---|
| 1,405,534 | 2/1922 | Merritt | 174/126 CP |
| 2,359,090 | 9/1944 | Dyer | 174/128 R |
| 3,029,589 | 4/1962 | Caroselli | 57/229 X |
| 3,264,404 | 8/1966 | Trebby et al. | 174/129 R |
| 3,291,897 | 12/1966 | Bramley | 256/10 X |
| 3,636,242 | 1/1972 | Hansson | 174/126 CP |
| 3,642,516 | 2/1972 | Gasaway et al. | 427/389.8 X |
| 3,644,866 | 2/1972 | Deardurff | 174/130 X |
| 3,647,939 | 3/1972 | Schoerner | 174/130 X |
| 3,980,277 | 9/1976 | Enoksson | 256/10 |
| 4,300,306 | 11/1981 | Hudgin | 256/10 X |
| 4,458,107 | 7/1984 | Heroux | 174/130 X |
| 4,463,323 | 7/1984 | Piper | 174/117 M |
| 4,494,733 | 1/1985 | Olsson | 174/117 M X |
| 4,527,135 | 7/1985 | Piper | 174/117 M X |

FOREIGN PATENT DOCUMENTS

| | | | |
|---|---|---|---|
| 2532908 | 2/1976 | Fed. Rep. of Germany | 174/117 M |

*Primary Examiner*—Randolph A. Reese
*Assistant Examiner*—Peter M. Cuomo
*Attorney, Agent, or Firm*—Fitzpatrick, Cella, Harper & Scinto

[57] ABSTRACT

An electric fence wire construction is made by plying or weaving coated supporting members, preferably fiberglass coated with polyvinyl chloride, with conducting members, preferably aluminum.

26 Claims, 7 Drawing Figures

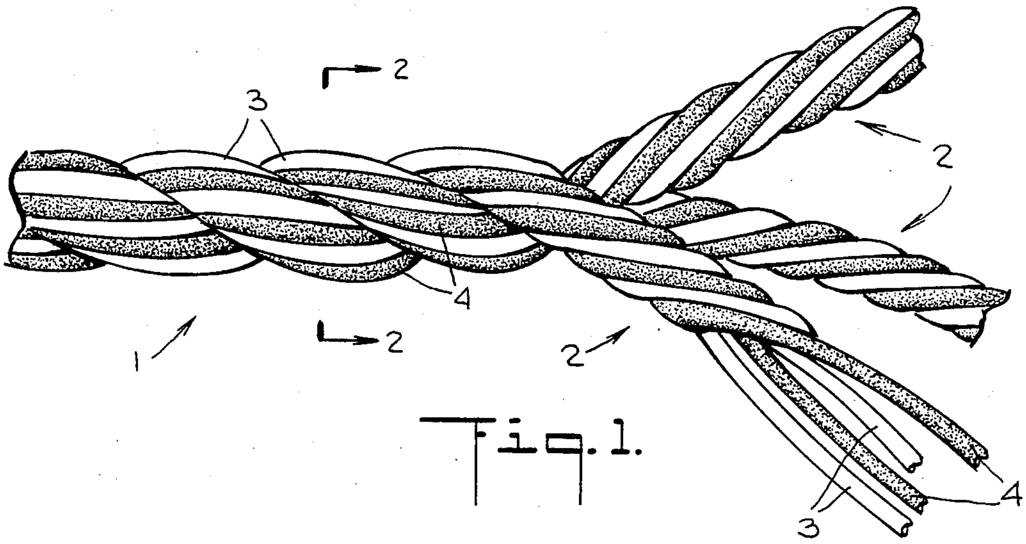
Fig. 1.
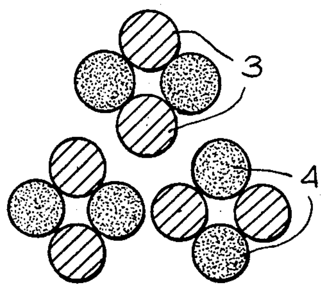
Fig. 2.
Fig. 3.
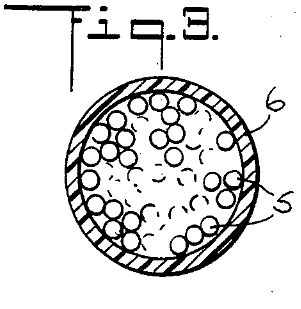
Fig. 4.
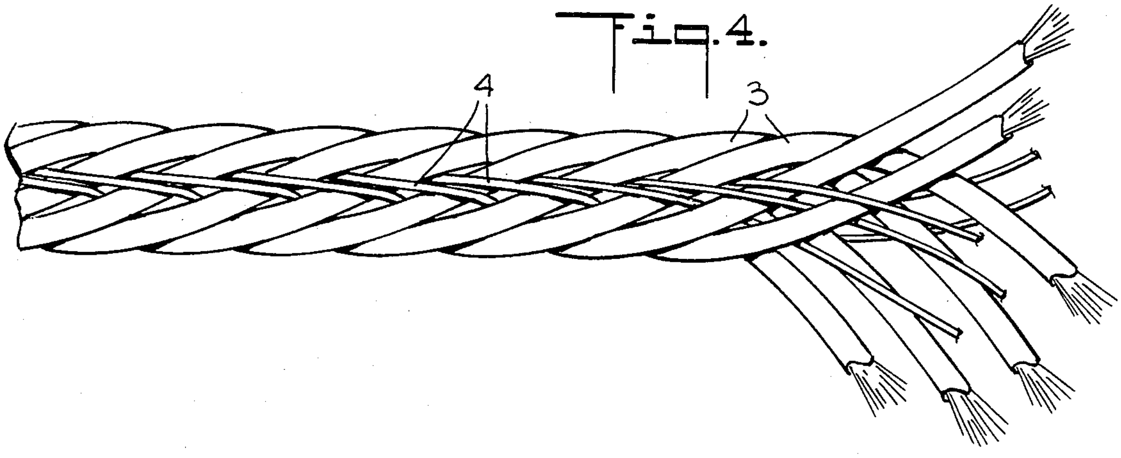

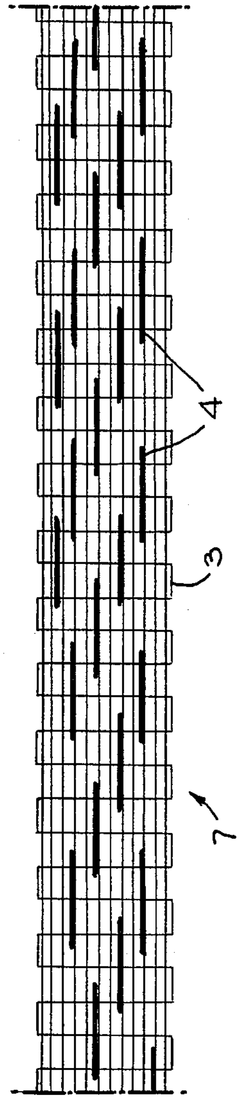
Fig. 5.
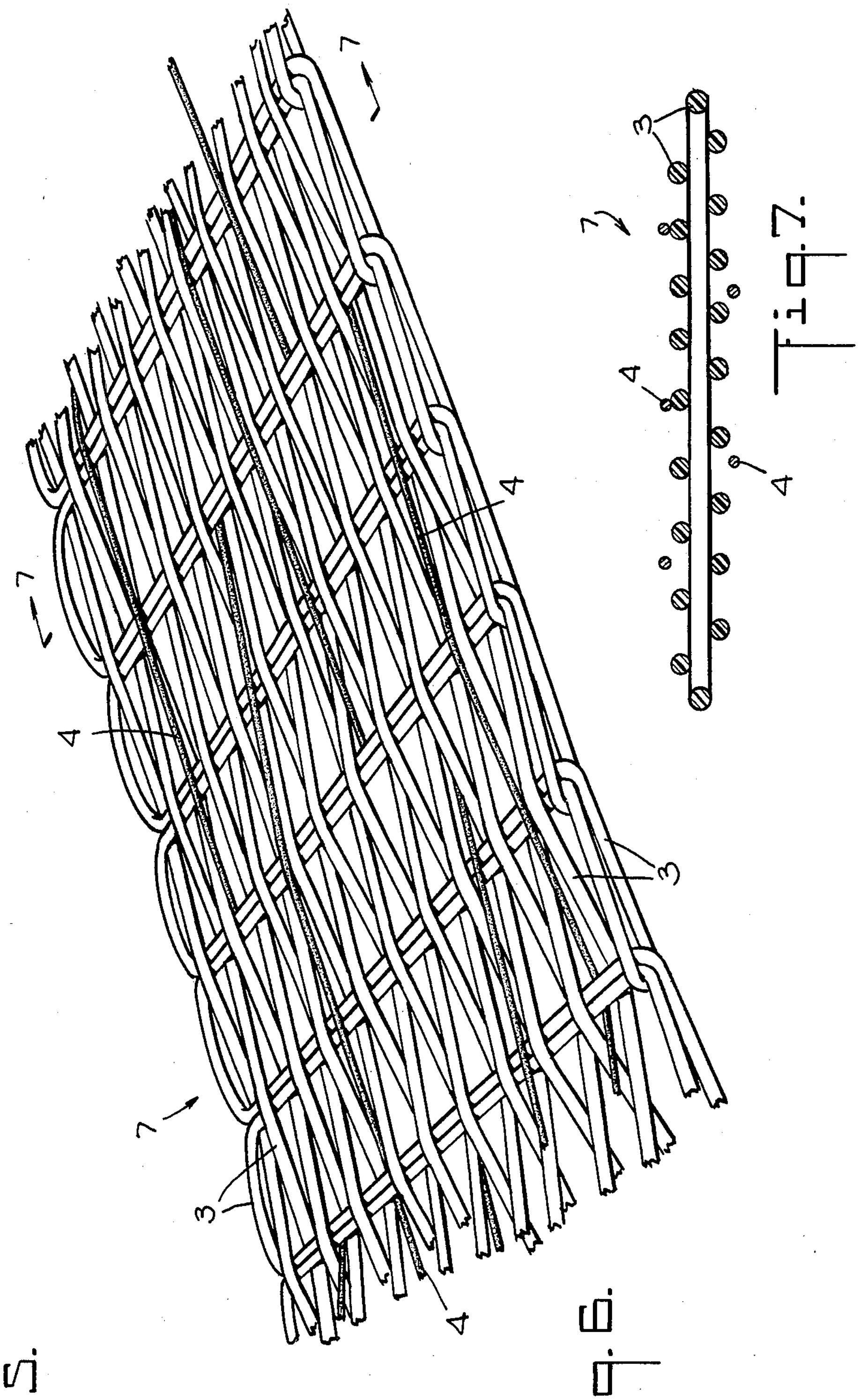
Fig. 6.
Fig. 7.

ELECTRIC FENCE WIRE CONSTRUCTION

This application is a continuation-in-part of Ser. No. 531,720, filed Sept. 13, 1983, now abandoned.

BACKGROUND OF THE INVENTION

1. Field of the Invention

This invention relates to an improved electric fence wire construction for use by cattlemen, farmers, and others. Electric fence wire constructions carry an electric charge which shocks animals upon contact with the outer surface of the construction and tends to prevent their crossing the fence. These constructions are strung from fence posts or other convenient attachment points. They may be used as perimeter fencing to enclose animals or to keep out predators. They may also be used to subdivide pastures temporarily to insure that they are grazed uniformly, in which case the electric fence wire construction may be taken down and restrung every few days forcing animals to graze different strips of land in regular rotation.

The electric fence wire construction of this invention comprises both support members and conductive members which should have several inter-related, special characteristics to perform well. The wire construction should be abrasion resistant, sufficiently light in weight to be portable, and flame resistant (that is to say, self-extinguishing or unable to support combustion). It should be reasonably flexible, yet strong, should knot without breaking, and should hold a knot without slipping. Because these wire constructions may be relocated several times, they should resist wear not only while in use, but also during handling when they are taken down and put up for relocation to another site. The conductive members should have a high degree of conductivity and be sufficiently malleable to perform satisfactorily in splicing. Furthermore, electric fence wire constructions should retain these properties when subjected to extremes of weather and temperature over long periods. For example, the wire construction should resist fading, corrosion, and loss of strength in blizzards at less than −50° F. (−46° C.) and direct sunlight at above 100° F. (38° C.), and have a low coefficient of linear expansion to resist contraction when cold and sagging when warm.

2. Description of the Prior Art

For several years the prior art has been typified by single component constructions of galvanized steel wire, which are sufficiently thick to serve both conducting and supporting functions simultaneously, and by a plied, rope-like combination electric fence wire construction in which an olefin fiber such as polyethylene or polypropylene fiber serves as the supporting member and stainless steel wire serves as the conducting member. U.S. Pat. No. 3,291,897 (Bramley) shows an example of this latter construction.

These prior art electric fence wire constructions suffer several drawbacks, which as far as we know the art has not solved in the seventeen years since the Bramley Patent issued. The single component steel wire constructions, while strong, are too heavy for easy portability and installation and hence are impractical in many situations. In the combinations of olefin supporting members with stainless steel, the stainless steel wire construction when spliced or knotted has heated sufficiently to cause fires. To compound this problem, flames have been carried along the length of the wire construction by prior art supporting members, spreading the fire to adjacent fields or buildings. These prior art supporting members have also been subject to loss of strength upon exposure to weather, particularly to the ultraviolet rays in sunlight. Furthermore, olefin fibers do not hold a knot well; the ability to hold a knot is important, for example, when splicing the beginning of one package of electric fence wire to the end of another or when repairing a break.

Composite electric fence wire constructions of the prior art have occasionally been made with tinned copper as the conductor, which eliminated problems of low conductivity but was too weak to withstand breakage during use, and particularly during winding and unwinding the wire construction during temporary installation. Hence, as far as we know tinned copper is used little if at all.

We have noticed an additional problem in prior art combination electric fence wire construction when made for example from stainless steel supported by a conventional olefin. When stretched during installation or use, the conducting member may break while the supporting member remains intact. It is then difficult to locate the particular section of the electric fence wire construction which needs replacing.

SUMMARY OF THE INVENTION

Our invention can solve or mitigate these problems and provides additional advantages. It makes possible the use of low-stretch, light-weight support members, conductors with superior conductivity, and provides electric fence wire constructions with superior flame resistance, superior strength, superior resistance to wear and weathering, and superior knotting characteristics. In particular, the use of low stretch supporting materials is effective in preventing fracture of the conductor significantly before breaking of the entire fence wire construction.

In one aspect the present invention comprises (a) an elongated support member which comprises a core material and a coating and (b) an elongated conductive member. The core material of the support member provides a significant amount of strength to the support member. By braiding or twisting and plying we assemble the coated support member and the conductive member with a substantial portion of the conductive member exposed to the outer surface of the construction. One or a number of supporting filaments or strands may be assembled with one or a number of filaments or strands of conductor to make the electric fence wire construction. We use "filament" to identify a single fiber; groups of filaments make up a "strand"; and one or more strands make up a "yarn".

A single coating may be applied around each strand of supporting material. Alternatively, strands may be coated or impregnated with a material of low viscosity such that each individual filament as well as the entire group is encapsulated, for example using a resinous solution or latex.

By selecting a coating material which is characterized by substantially greater abrasion resistance, or fracture resistance when knotted, than the core material, we have found that high-strength, low stretch core materials such as fiberglass, which would be expected to break when used in electric fence wire constructions, can in fact be adapted for such use and the cost of such coatings is more than offset by the resulting combination of strength, durability, flexibility and other improved properties which are obtained. For example, the application of such coatings gives abrasion resistance to each of the individual filaments and results in improved properties insofar as resistance to breakage due to knotting is concerned.

In addition, by selecting and applying a coating material which is resistant to weathering (for example, exposure to chemicals, moisture, and the effects of ultra-violet radiation), to a substantially greater degree than the core material, one is able to use core materials which would not otherwise be satisfactory in electric fence wire constructions. Moreover, not only are the properties obtained by using a coating material and a core material in the support member improved over the use of either material alone, but the improvements are sufficiently great to justify the added step of applying the materials. The coating may be applied using any one of various methods, including extrusion and crosshead extrusion, or it may be applied as a liquid using polyvinyl chloride in the form of a plastisol, organosol, latex or other solution or dispersion, by dip-coating, curtain coating, or other method, metering off any excess if necessary, and then drying, fusing or curing, depending upon the requirements of the solution or dispersion. The resulting coated strand preferably has a total diameter of about 20 mils (500 microns).

Other possible coatings include plastics or rubbers such as polyurethanes, acrylics and polyesters chosen for their good weather resistance, flame retardance, ability to receive color and color fastness, ability to impart good knot holding characteristics (i.e., not slippery), or abrasion or fracture resistance. These coatings may be solid or plastic foams.

We prefer to combine filaments of a support material into strands and apply coating to the strands. We then prefer to ply one or several of these strands with strands or individual filaments of conductive material into yarns containing support material and conductive material, and to ply these yarns to make the final electric fence wire construction. Braiding may also be used to make these constructions and has the advantage of unraveling less than plied constructions.

The support member we prefer to use is fiberglass coated with a polyvinyl chloride which includes flame inhibitors of the kind known for use with polyvinyl chloride. We have found this composite is flame resistant, strong, low-stretch, and capable of holding a knot well. It also has reduced problems of abrasion and loss of strength in knotting due to stress fracture, which fiberglass alone would exhibit. Such composites have been proven in outdoor use as insect screens to have superior characteristics of resistance to weathering and fading, but we are aware of no previous use in electric fence wire construction or under the full range of conditions to which electric fence wire constructions are subject.

The conductive member we prefer to use is aluminum wire, and we find most preferable wire drawn from an alloy which has on its surface a metallurgically bonded aluminum alloy coating that is anodic to the core and thus electrolytcally protects the core against corrosion, such as known at present in the industry as Alclad 5056. Alclad 5056 has proven its corrosion resistance through use in braided cable armor wire, insect screen cloth, and chain link fence, but we are aware of no previous use in electric fence wire construction or under the full range of conditions to which electric fence wire constructions are subject.

BRIEF DESCRIPTION OF THE DRAWINGS

FIG. 1 is a side elevational view of a twisted and plied electric fence wire construction according to the present invention;

FIG. 2 is a cross-sectional view taken at line 2—2 of FIG. 1;

FIG. 3 is an enlarged cross-sectional view of one strand of a support member of FIG. 1;

FIG. 4 is a side elevational view of a braided electric fence wire construction according to the present invention.

FIG. 5 is the top elevational view of one embodiment of a ribbon electric fence wire construction according to the present invention;

FIG. 6 is a three-quarter view taken at line 7—7 of FIG. 6.

FIG. 7 is a cross-sectional view taken at line 7—7 of FIG. 6. These figures are not drawn to scale.

DETAILED DESCRIPTION OF THE PREFERRED EMBODIMENTS

Referring to the FIGS. 1 to 3, an electric fence wire construction 1 comprises yarns 2 which are plied together. Each yarn 2 is made up of coated support members 3 and conductive members 4 which are twisted together. The support members comprise filaments 5, which may be fiberglass, and a coating 6, which may be polyvinyl chloride. In FIG. 4, the coated support members 3 and the conductive members 4 are braided together. FIGS. 5 to 7 shows one embodiment of a ribbon electric fence wire construction. The ribbon 7 is made up of coated support members 3 and conductive members 4 which are woven in a conventional ribbon construction.

We prefer to ply two strands of fiberglass supporting material coated with polyvinyl chloride and two filaments of aluminum conductor together at about 3½ turns per inch ("TPI") in the "Z" direction, and to ply three of these yarns together at 1½ TPI "S" twist to provide the finished product, which is therefore composed of six strands of a coated fiberglass and six filaments of aluminum conductor. The individual yarns in our invention may preferably be twisted from about one to about six turns per inch and the final yarns plied in a yarn from about one-half to six turns per inch. The electric fence wire construction of the present invention may be braided or twisted and plied on conventional machines such as those used for twine or rope.

The word "intermesh" is used herein to refer to the twisted and plied construction of FIG. 1, to the braided construction of FIG. 4, to the woven construction used in the ribbon of FIG. 5, to other constructions described herein and to equivalent constructions for making conductive members lay beside and be supported by support members in electric fence wire.

In ribbon embodiments we prefer to use support members comprising a fiberglass core coated with polyvinyl chloride, although other support member constructions may be used. We also prefer to use in ribbon embodiments a conductive member of aluminum, most preferably having a core of aluminum and a cladding of aluminum alloy such as Alclad 5056. The conductive member may be woven, including forms of interlacing, (i) lengthwise along the ribbon (that is, in the warp direction), (ii) across the ribbon, or (iii) in both directions. The conductive filaments may comprise from zero to all of the filaments or stands in either the lengthwise or crosswire direction. FIGS. 5 to 7 shown an embodiment in which about one conductive filament is used for every five to ten of other supporting lengthwise strands.

We prefer to use low-twist fiberglass strands known in the industry as 37 1/0. The designation 37 indicates that 3700 yards of the fiberglass weigh one pound. The 1/0 indicates that the number of twisted strands plied together is one and the number of single strands twisted in continuous filaments is zero. The individual filaments making up a single strand of 37 1/0 may number between 800 and 1600 and may be either G (9 micrometers diameter) or DE (6 micrometers diameter). The fiberglass we use is typically continuous filament made from electrical grade glass. Fiberglass weights may range from about 18⅓ (or 1500 tex) to about 150 1/0 (or 33 tex), where tex indicates the number of grams per thousand meters of the particular fiber.

Most fiberglass fibers in uncoated condition come with chemical sizes (surface finishes containing some chemical constituents other than water) applied by the manufacturer. These may be starch sizes or preferably lubricating hydrophobic sizes which keep water from the glass and lubricate the individual filaments to reduce abrasion.

Glass is also desirable for its low coefficient of linear expansion, for example, typically about $5\times10^{-6}$ centimeters per centimeter per degree centigrade. By way of comparison, steel has a factor of about $10\times10^{-6}$, aluminum a factor of about $20\times10^{-6}$, and polypropylene about $80\times10^{-6}$ centimeters per centimeter per degree centigrade.

Our most preferred support members have very low stretch, less than about four to five percent elongation of single filaments before breaking. Materials for such members include fiberglass. High modulus, high tenacity poly (p-phenylene terphthalamide) fiber such as Kevlar-type aramid fibers, and high tenacity rayon fibers may also be used. Supporting materials with up to about ten percent elongation of single filaments at break are also desirable, and supporting materials of up to about thirty percent elongation of single filaments at break may be used. Support member core fibers may include polyester, nylon, and other materials, particularly where their stretch properties are kept below thirty percent.

While materials such as the present Alclad 5056 aluminum is the most preferred conducting member, other aluminum alloys are preferred and other conductors may be used including stainless steel and tinned copper. Aluminum used in our invention is preferably about 0.010 inches (0.0254 cm.) in diameter but may range in diameter from about 0.005 inches (0.0127 cm.) to about 0.020 inches (0.0508 cm.).

The construction of this invention has superior properties in that it resists weathering and has superior conductivity. By way of comparison, electric fence wire construction in the prior art using uncoated olefins lost its strength after two years of outdoor use, whereas fence wire construction of the present invention should not.

Electric fence wire construction of this invention is resistant to stretching, and particularly the supporting fibers are resistant to stretching, so that the conductor and the supporting fibers in our tests break at substantially the same time, which makes broken conductors easy to locate. The wire construction of this invention has also been found in our testing to knot well, and to resist stress fracture, abrasion, and flames. The conductor is sufficiently malleable to perform well in splicing.

In the prior art, stainless steel wire construction was typically plied as four strands polyethylene to one strand of stainless steel wire construction to make up a yarn. Three of these yarns were then plied together to make the final electric fence wire construction, which therefore contained a total of three ends of stainless steel conductor and twelve ends of supporting fiber of polyethylene or polypropylene. In some of this prior art, the stainless steel wire construction had been overfed to make it lie loosely in the polyethylene supporting fibers.

Preferred embodiments of the present invention have been described above in detail for purposes of illustration. Modifications may be made by those skilled in the art to the preferred embodiment of electric fence wire constructions described above in order to adapt them to particular applications.

We claim:

1. An improved electric fence wire construction comprising a. an elongated support member comprising a core material, which provides a significant amount of strength to the support member, and a coating material coating the core material; and b. an elongated conductive member intermeshed with and supported by the support member with a substantial portion of the conductive member exposed to the outer surface of the construction, said support member being characterized by a breaking elongation which is substantially equal to or less than the breaking elongation of the conductive member.

2. The improved electric fence wire of claim 1 in which the coating material is characterized by substantially greater abrasion resistance than the core material.

3. The improved electric fence wire of claim 1 in which the coating material is characterized by substantially greater resistance to fracture due to knotting than the core material.

4. The improved electric fence wire of claim 1 in which the coating material is characterized by resistance to weathering to a substantially greater degree than the core material.

5. The electric fence wire construction of claim 1 in which the core material is fiberglass.

6. The electric fence wire construction of claim 1 in which the coating material is polyvinyl chloride.

7. The electric fence wire construction of claim 1 in which the core material has an individual filament breaking elongation of about 30% or less.

8. The electric fence wire construction of claim 1 in which the core material has an individual filament breaking elongation of about 10% or less.

9. The electric fence wire construction of claim 1 in which the core material has an individual filament breaking elongation of about 5% or less.

10. The electric fence wire construction of claim 1 in which the conductive member comprises a high strength conductive central core region and a weather resistant conductive cladding.

11. The electric fence wire construction of claim 1 in which the conductive member comprises a central core region of conductive material and a surface layer of a conductive material which layer is anodic to the conductive material of the central core region to which it is bonded, whereby the central core is electrolytically protected against corrosion.

12. The improved electric fence wire construction of claim 11 in which the conductive member consists essentially of one or more aluminum alloys.

13. The electric fence wire construction of claim 12 in which the central core region is aluminum alloy 5056.

14. The electric fence wire construction of claim 12 in which at least two strands of the support member are plied with at least two filaments of the conductive member to form yarns, and at least two such yarns are plied together to complete said electric fence wire construction.

15. The electric fence wire construction of claim 14 in which the support member comprises a fiberglass material coated with polyvinyl chloride and the conductive material comprises aluminum.

16. The electric fence wire construction of claim 1 in which the construction is in the form of a ribbon and the elongated conductive member is woven in the ribbon construction.

17. The electric fence wire construction of claim 16 in which the coating material is characterized by substantially greater abrasion resistance than the core material.

18. The electric fence wire construction of claim 16 in which the coating material is polyvinyl chloride.

19. An electric fence wire assembly comprising
an elongated support member and
an elongated electrical conductor intermeshed with the support member so that the support member supports the conductor with a substantial portion of the surface of the conductor being exposed,
said support member comprising a core and a coating on the core for protecting the core from abrasion caused by its use in an electric fence wire assembly and, said support member being characterized by a breaking elongation which is substantially equal to or less than the breaking elongation of the conductive member.

20. An electric fence wire assembly comprising
an elongated support member and
an elongated electrical conductor intermeshed with the support member so that the support member supports the conductor with a substantial portion of the surface of the conductor being exposed,
the support member being made of a material which fractures under less longitudinal strain than the conductor.

21. An improved electric fence wire construction comprising
an elongated support member and
an elongated electrical conductor intermeshed with the support member so that the support member supports the conductor with a substantial portion of the surface of the conductor being exposed,
said conducting member consisting essentially of one or more aluminum alloys, and said support member being characterized by a breaking elongation which is substantially equal to or less than the breaking elongation of the conductive member.

22. The electric fence wire construction of claim 18 in which the conductor consists essentially of a high strength conductive central core region and a weather resistant conductive cladding.

23. An improved electric fence wire construction comprising
a. an elongated support member comprising a core material, which provides a significant amount of strength to the support member, and a coating material coating the core material; and
b. an elongated conductive member woven with and supported by the support member with a substantial portion of the conductive member exposed to the outer surface of the construction, said support member being characterized by a breaking elongation which is substantially equal to or less than the breaking elongation of the conductive member.

24. An electric fence wire assembly comprising
an elongated support member and
an elongated electrical conductor woven with the support member so that the support member supports conductor with a substantial portion or the surface of the conductor being exposed,
said support member comprising a core and a coating on the core for protecting the core from abrasion caused by its use in an electric fence wire assembly, and said support member being characterized by a breaking elongation which is substantially equal to or less than the breaking elongation of the conductive member.

25. An improved electric fence wire construction comprising
an elongated support member and
an elongated electrical conductor woven with the support member so that the support member supports the conductor with a substantial portion of the surface of the conductor being exposed,
said conducting member consisting essentially of one or more aluminum alloys, and said support member being characterized by a breaking elongation which is substantially equal to or less than the breaking elongation of the conductive member.

26. The electric fence wire construction of claim 25 in which the conductor consists essentially of a high strength conductive central core region and a weather resistant conductive cladding.

* * * * *

UNITED STATES PATENT AND TRADEMARK OFFICE
CERTIFICATE OF CORRECTION

PATENT NO. : 4,728,080

DATED : March 1, 1988

INVENTOR(S) : FELIX KURSCHNER, ET AL.

It is certified that error appears in the above-identified patent and that said Letters Patent is hereby corrected as shown below:

AT [75] IN THE INVENTORS

"Richard J. Goodings," should read --Richard L. Goodings,--.

COLUMN 3

Line 61, "electrolytcally" should read --electrolytically--.

COLUMN 4

LIne 68, "stands" should read --strands--.

COLUMN 5

Line 1, "crosswire" should read --crosswise--.
Line 16, "181/3" should read --18 1/3--.

UNITED STATES PATENT AND TRADEMARK OFFICE
CERTIFICATE OF CORRECTION

PATENT NO. : 4,728,080
DATED : March 1, 1988
INVENTOR(S) : FELIX KURSCHNER, ET AL.

It is certified that error appears in the above-identified patent and that said Letters Patent is hereby corrected as shown below:

COLUMN 8

Line 8, "claim 18" should read --claim 21--.
Line 29, "conductor" should read --the conductor--.
Line 29, "or" should read --of--.

Signed and Sealed this

Sixteenth Day of August, 1988

*Attest:*

DONALD J. QUIGG

*Attesting Officer*

*Commissioner of Patents and Trademarks*